United States Patent Office 3,009,899
Patented Nov. 21, 1961

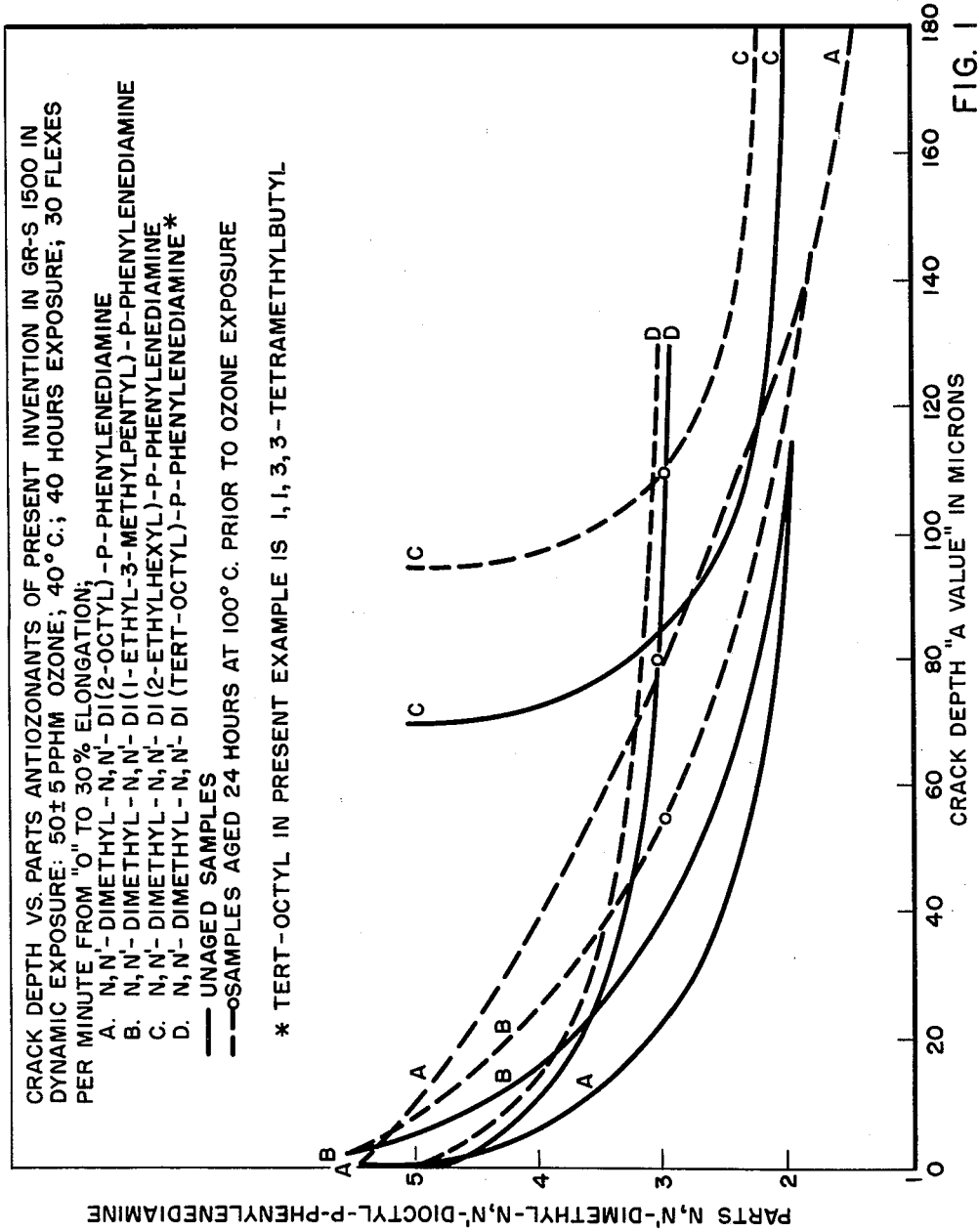

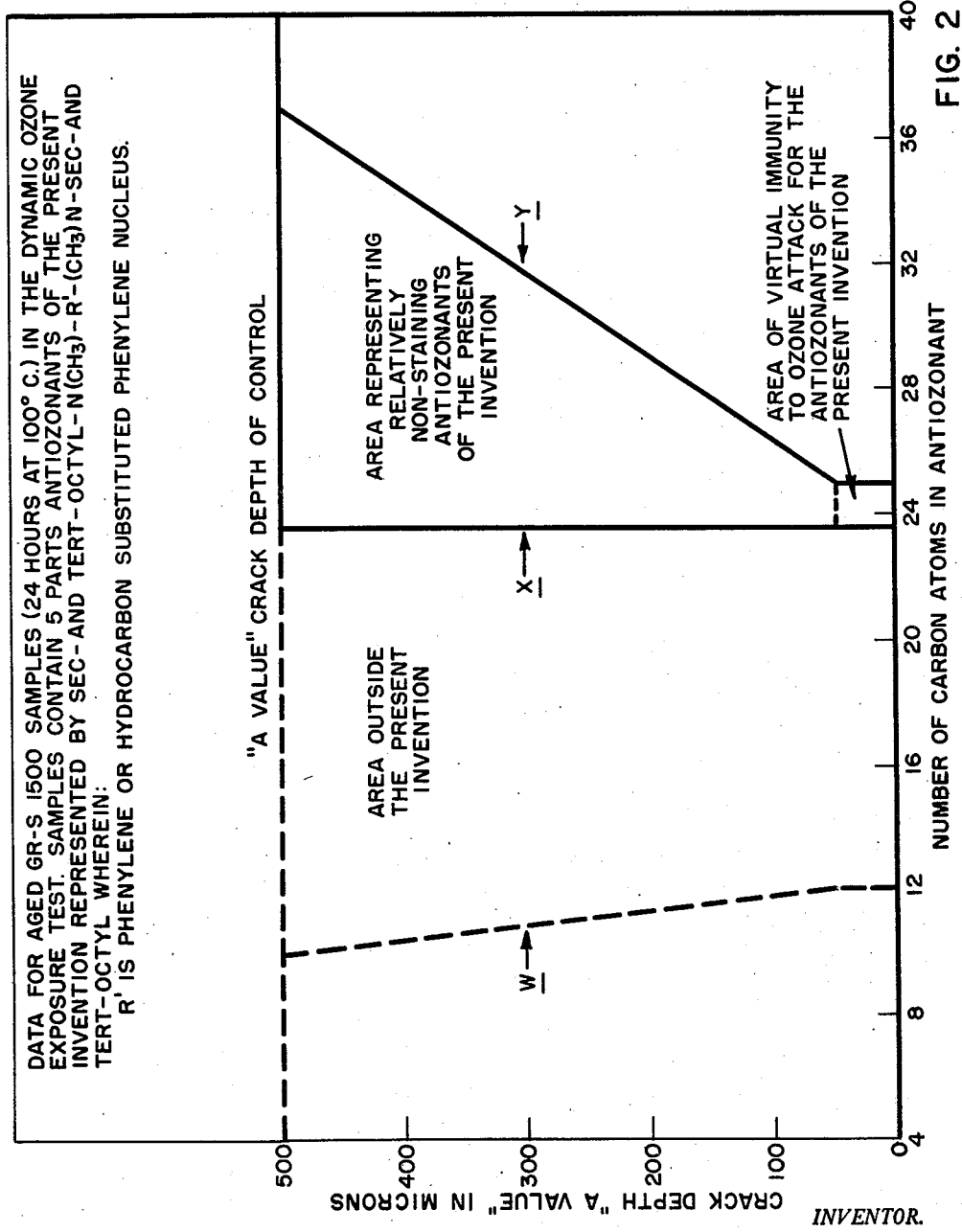

3,009,899
RUBBER CONTAINING PARA-PHENYLENE-
DIAMINE ANTIOZONANTS
Eldon Everett Stahly, Birmingham, Mich., assignor, by
direct and mesne assignments, of three-fourths to Oliver
W. Burke, Jr., Grosse Pointe, Mich., and one-fourth to
Eastman Kodak Company, Rochester, N.Y., a corporation of New Jersey
Filed Feb. 14, 1958, Ser. No. 715,339
3 Claims. (Cl. 260—45.9)

The present invention relates to antiozonants for high polymers per se subject to ozone attack, especially vulcanizable elastomers including the natural rubbers, synthetic elastomers such as polybutadiene, GR–S type synthetic rubbers, other diene-vinyl copolymers such as acrylonitrile-butadiene elastomers, etc., and in addition the non-vulcanizable elastomers, plastomers and resins, particularly those which have residual unsaturation and aims generally to improve the same.

The present invention discloses a specific class of antiozonants conforming to the formulation $$RN(CH_3)—R'—N(CH_3)R''$$

wherein R and R'' are selected from the class of secondary and tertiary octyl, nonyl, decyl, undecyl and dodecyl radicals and R' is a phenylene or diphenylene nucleus. These new antiozonants when incorporated into high polymeric materials per se subject to ozone attack protect said polymeric materials against such ozone attack. In the present invention R and R'' of the above mentioned formulation are preferably octyl groups including secondary and tertiary octyl groups, R' is preferably para-phenylene, hydrocarbon substituted phenylene or p,p'-diphenylene, or hydrocarbon substituted diphenylene radicals, and the total number of carbon atoms in the compound lie within the range of 24 to 37.

PROLOGUE AND OBJECTS

It is well known that many compounds possess the property of preserving rubber, when incorporated therein, against the superficial hardening and crazing resulting from attack by oxygen, light and heat. Such compounds are termed "antioxidants." However, as pointed out in copending U.S. application S.N. 470,401, filed Nov. 22, 1954, the previously known antioxidants have not been effective to guard against the distinctly different effects of ozone on such materials, of which the generation of deep penetrating cracks is characteristic.

It has long been recognized that a solution of the problem of ozone attack on both natural and synthetic rubber goods is greatly needed and that reduction of ozone attack or freeing of such goods from ozone attack is of high importance. Indeed, as early as 1944 the ASTM prescribed a testing procedure for measuring ozone attack in connection with essentially "static" goods, such as refrigerator gaskets, windshield mountings and the like.

It has more recently been recognized that when "dynamically flexed" rubber goods, such as tires, are made in the usual way with or without antioxidants, such articles are subject to deterioration by ozone attack, whether in continuous or intermittent use or storage.

As above noted, attack by ozone on statically or dynamically employed rubber goods becomes apparent by the development of penetrating cracks which progressively become deeper with time of exposure to the atmosphere, which practically always contains ozone in trace amounts. Such cracks in tires often become sufficiently deep to cause failure. Indeed, in the case of new tires stored for substantial periods, such cracks may cause failure within a relatively short time after the tires are put into use. This result of ozone attack is thus quite distinct from the development of fine surface cracks, i.e., checking and crazing, attributed to oxidative deterioration.

Ozone attack is extremely bad in areas indigent to cities such as Los Angeles, California, where smog conditions are associated with high ozone concentration, e.g. from 10 parts to 60 parts per hundred million. In Los Angeles and similar high-ozone areas so-called ozone cracks may develop in rubber articles such as tires, in less than a month of storage time. In areas such as Detroit, Michigan, the normal ozone concentration in the air is less than 5 parts per hundred million, and ozone cracks may not develop for several months.

In any event ozone-cracking is recognized as one of the heretofore important unsolved problems in storage and use of articles containing natural or synthetic rubber components, and the invention in said copending applications, and herein, aim to provide solutions for that problem, especially with respect to elastomers employed in dynamic usage.

For many years the rubber industry has employed chemicals such as Santoflex AW (the trade name for 6-ethoxy-2,2,4-trimethyl-1,2-dihydroquinoline) in rubber articles to protect the same against oxidation on aging. From a survey of chemicals used to protect the products of representative manufacturers of rubber goods, it appears that Santoflex AW had been widely accepted and used as one of the best materials available for that purpose. Accordingly, to demonstrate the ozone resistance afforded by new antiozonants, a GR–S compound, containing Santoflex AW, was compared with GR–S containing other antioxidant materials to demonstrate which of such materials seemed the most resistant to ozone attack under both static and dynamic conditions after subjecting to heat aging conditions, and since the Santoflex AW seemed to be the best of the materials so compared, though itself affording no adequate protection of elastomers against ozone attack, it was used as a standard for comparison to evaluate the improved resistance to such attacks imparted by new and synergistic antiozonant compositions (see SN. 470,401, filed Nov. 22, 1954). In spite of the accepted usage of Santoflex AW in the industry it will be noted from the tables hereinafter, in which this material is used as control, that relatively little protection of elastomers against ozone cracking is afforded by Santoflex AW as compared to the antiozonants of the present invention, particularly after the samples had been heat-aged to simulate the conditions accompanying subjection of the elastomers to dynamic usage.

A desirable property in case of antiozonants, as in the case of any other additives to rubber, is inertness with respect to the curing ingredients of the elastomer compound. The vulcanized compounds after exposure to heat-aging (24 hours at 100° C. is taken as an exacting standard herein) should still show from about 275% to 375%, or greater, elongation to be suitable for tire stocks. Original and heat-aged stress-strain properties were therefore both obtained to demonstrate that normal vulcanizations are obtainable with the antiozonants incorporated in the elastomer compounds. For the sake of brevity, the tensile properties have been omitted from the table wherein the samples showed the physical properties required of the elastomer stocks. Certain compounds including benzidine resulted in a very short stock after aging; while protection against ozone was good, such additives caused over-curing, thus rendering them unsuitable for use in GR–S stocks for manufacture of tires and many other articles of commerce. Antiozonants of said U.S. application do accelerate the elastomer vulcanization rate but are usable by adjustment of the conventional curing recipes in practical application.

A further desirable property of antiozonants as well as of any other additives is inertness with respect to development of color and stain in light colored elastomer compounds. Those additives which develop dark colors are less desirable, e.g., in elastomers which are to be employed in construction of white side-wall tires.

Thus, principal objects of the present invention are the provisions of (1) new antiozonants or chemical compounds for incorporation into elastomer and plastomer compositions which alone will effectively protect same against ozone cracking, especially after heat-aging, (2) synergistic combinations of two or more of said new antiozonants as well as synergistic combinations of said new antiozonants with known antiozonants and/or antioxidants for rubber and/or waxes which, with or without further synergistic combination with heavy metal soaps will effectively protect the same against ozone cracking, especially after aging or heat-aging, without deleteriously altering the physical properties of the protected materials, (3) antiozonants which have low effect on the vulcanization rate of the elastomers incorporating them, (4) antiozonants which are low in staining characteristics, (5) new methods of protecting elastomers and plastomers from ozone attack characterized by the use of such new materials, (6) elastomer and plastomer articles including such chemicals and rendered ozone resistant thereby. Other objects and advantages of the invention will be made apparent from more detailed description and examples of its application.

The invention of the present application resides in the new class of antiozonants and the novel compounds of such class herein disclosed, the synergistic combinations thereof with antioxidants and/or waxes with or without the added synergism with heavy metal soaps, and methods of applying said new antiozonants and synergistic combinations, and the improved products containing the same. This invention thus comprises, inter alia, (1) a class of the new and useful antiozonants for rubber conforming to the formula R—N(CH$_3$)—R'—N(CH$_3$)—R'', wherein R and R'' are selected from the class consisting of sec.- or tert.-octyl, nonyl, decyl, undecyl, and dodecyl, R' is p-phenylene or hydrocarbon substituted p-phenylene, p,p'-diphenylene or hydrocarbon-substituted diphenylene and the total carbon counts of the members of the new class are within the range of 24 to 37, and (2) the previously unknown useful chemical compounds herein disclosed, per se, as will be apparent from the following detailed descriptions and examples, which are to be taken as illustrative and not restrictive of the invention, the scope of which is more particularly pointed out in the appended claims.

The term diphenylene radical as used herein includes p,p'-methylene-diphenylene, and p,p'-imino-diphenylene. The preferred R and R'' of the new antiozonants of the present invention are sec.- or tert.-octyl groups which encompass the following.

Secondary octyl radicals:
  2-octyl
  3-octyl
  4-octyl
  2-methyl-3-heptyl
  2-methyl-4-heptyl
  6-methyl-3-heptyl
  6-methyl-2-heptyl
  3-methyl-2-heptyl
  3-methyl-4-heptyl
  5-methyl-3-heptyl
  4-methyl-2-heptyl
  5-methyl-2-heptyl
  4-methyl-3-heptyl
  3-ethyl-2-hexyl
  4-ethyl-3-hexyl
  2,2-dimethyl-3-hexyl
  2,5-dimethyl-3-hexyl
  5,5-dimethyl-3-hexyl
  4,4-dimethyl-3-hexyl
  3,3-dimethyl-2-hexyl
  4,4-dimethyl-2-hexyl
  5,5-dimethyl-2-hexyl
  4,5-dimethyl-3-hexyl
  4,5-dimethyl-2-hexyl
  3,5-dimethyl-2-hexyl
  3-isopropyl-2-pentyl
  4-ethyl-2-hexyl
  3,3,4-trimethyl-2-pentyl
  2,4,4-trimethyl-3-pentyl
  3,4,4-trimethyl-2-pentyl
  3-methyl-3-ethyl-2-pentyl
  4-methyl-3-ethyl-2-pentyl
  2,4-dimethyl-3-hexyl
  3,4-dimethyl-2-hexyl Tertiary octyl radicals:
  1,1-dimethylhexyl
  1-methyl-1-ethylpentyl
  1-methyl-1-propylbutyl
  1,1-diethyl-butyl
  1,2-dimethyl-1-ethylbutyl
  1,1,3,3-tetramethylbutyl
  1,1,2,3-tetramethylbutyl
  1,1,2-trimethylpentyl
  1,1,3-trimethylpentyl
  1,1,4-trimethylpentyl
  1,1-dimethyl-2-ethylbutyl
  1,3-dimethyl-1-ethylbutyl
  1,1-diisopropylethyl
  1,1,2,2-tetramethylbutyl It is evident that the materials of the present invention are mono- and di-arylene diamines, which in all cases have four substituent radicals on the two amino groups. The methyl substituents may be introduced into the parent N,N'-disubstituted amines by reacting the latter with appropriate reagents as hereinafter described, or in other ways.

The methyl derivatives have now been found to have definite advantages over the parent compound (i.e., R—NH—R'—NH—R''), for example, advantages in scorch time and/or aging characteristics of the elastomer compounds in which the said antiozonant is incorporated, advantages in decreased tendency to color or stain light colored elastomer stocks, or in other characteristics.

Also, while for greater antiozonant activity, it is preferred that R' be an unsubstituted or hydrocarbon substituted phenylene radical, within the broader aspects of the invention, diphenylene radicals selected from the group consisting of diphenylene, methylenediphenylene and iminodiphenylene, unsubstituted and hydrocarbon substituted, may be employed as R'. The present invention demonstrates that methylation of the parent N,N'-dialkyl compounds produces N,N'-dimethyl-N,N'-dialkyl derivatives having particular advantages in antiozone activity (particularly in acrylonitrile rubbers and natural rubber), low scorch and low staining characteristics.

The appropriate incorporation of the new antiozonants gives virtual immunity against much higher than ordinary atmospheric concentrations of ozone to elastomer compositions even when the same have been subjected to radical heat-aging, thus showing that these antiozonants are capable of protecting the products for long periods of time under conditions of dynamic usage as well as in static usages.

In the accompanying drawings pertaining to representative categories of the invention:

FIGURE 1 is an illustrative chart drawn to simple co-ordinates showing effective concentrations of antiozonants of the present invention in GR-S 1500 compounds.

FIGURE 2 is an illustrative chart drawn to simple coordinates showing the range of carbon atoms of the relative non-staining antiozonants disclosed and claimed herein.

PREPARATION OF ANTIOZONANTS

The parent symmetrical N,N'-di-(higher alkyl)-p-phenylenediamine compounds of the present invention may be prepared in a simple manner. For example one of the compounds of the above identified class may be prepared by aminative reduction of 2-octanone with p-phenylenediamines and hydrogen; one mole $NH_2$—$C_6H_4$—$NH_2$ plus 2 moles 2-octanone plus excess hydrogen with a hydrogenating catalyst, such as copper chromite or Raney nickel, under the influence of heat and pressure, produces the N,N'-di(2-octyl) derivative of the diamine, namely, 2-octyl-NH—$C_6H_4$—NH-2-octyl. The above reaction can be run with one mole of 2-octanone so that the first product contains chiefly 2-octyl-NH—$C_6H_4$—$NH_2$, and this product can be further treated with a second ketone, e.g., 3-octanone, 4-octanone, 5-methyl-3-heptanone, a nonanone, decanone, undecanone, dodecanone and the like, to effect substitution in the second amino group by the corresponding alkyl group. This N,N'-dialkyl-p-phenylenediamine can be used as a parent di-substituted amine for preparation of N,N'-dimethyl-N,N'-(higher alkyl) derivatives as described in the third paragraph following.

An advantageous method for preparation of N,N'-di-substituted-p-phenylenediamine wherein the substituents are not identical depends on reaction of p-nitroaniline and an octanone. The resultant p-nitro Schiff base is hydrogenated in the presence of a second octanone and a catalyst such as Raney nickel or copper chromite, to produce the corresponding p-R″—NH—$C_6H_4$—NHR.

As an example of alkylation to produce the dimethyl substitutions of the parent diamines descriptive procedures are described for the preparations of the mono- and di-methyl substituted derivatives.

Two methyl groups may be introduced into a parent N,N'-dioctyl p-phenylenediamine or N-monooctyl p-phenylenediamine, by the well known method of heating with dimethyl sulfate at about 100° C. in an appropriate solvent such as water or an aqueous dioxane solution of NaOH, the NaOH being regulated to maintain basicity. The methyl sulfate and NaOH are added gradually to the water-diamine mixture or dioxane-water-substituted phenylenediamine mixture at 60–65° C., two mole weights of dimethyl sulfate being employed per mole weight of diamine derivative. After the additions are completed (about 2 hrs.) the mixture is heated for about one hour and the methylated products may be recovered by the following steps: (1) removal of water or water-dioxane by distillation, (2) separation by decantation, filtration, and the like, of the oil layer or solid material, as the case may be, from the remaining water solution, (3) distillation, or crystallization from a solvent such as isopropanol, benzene, or the like.

Instead of dimethyl sulfate, a methyl halide, e.g., chloride bromide or iodine may be employed to dimethylate the substituted p-phenylenediamine derivative. For example methyl iodide, aqueous sodium carbonate and the parent phenylenediamine compound suspended therein are refluxed to disappearance of the methyl iodide, the mixture is made strongly alkaline, extracted with ether, benzene, or the like and the extract dried over NaOH pellets, and distilled to yield the desired dimethylated product. There are other practical methods of preparation, and the described methods are mentioned as illustrative only.

Another convenient method of preparation of N,N'-dimethyl-N,N'-di-(higher alkyl)-p-arylene diamine (where higher alkyl may be a sec- or tert- radical in the range of octyl to dodecyl inclusive) involves reaction of N,N'-dialkyl-p-arylene-diamine with alkali metal alkyl to form the N,N'-dialkali metal-N,N'-dialkyl-p-arylene diamine which is subsequently reacted with a methyl halide, sulfate and the like, to form the corresponding N,N'-dimethyl-N,N'-dialkyl-p-arylenediamine. This procedure is particularly adapted to the preparation of N,N'-dimethyl-N,N'-di-t-alkyl-p-arylenediamines; e.g., a suspension of sodium amyl (2 mole weight) was reacted with N,N' - di - (2,4,4 - trimethyl - 2 - pentyl) - p - phenylenediamine dissolved in 1 liter of n-pentane (2 hrs. at 30 to 35° C.) The resultant suspension of disodium compound was reacted with 2 mole weights of methyl iodide for 2 hours at 30–35° C.) After water-washing, the pentane was evaporated to yield almost quantitatively the desired amine oil. The following equations represent the reaction:

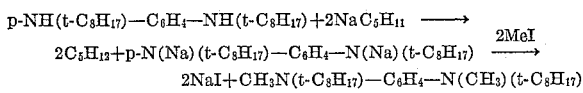

(The parent N,N-di-t-$C_8H_{17}$-p-phenylenediamine may be prepared from the N-sodio-t-octyl amine and p-di-chlorobenzene.)

It has also been found that salts formed from dibasic acids and substituted p-phenylenediamine antiozonants of this invention, such as oxalates and maleates thereof, can be employed as antiozonants; conversion to such salts dilute the antiozone activity of the substituted diamines but serves to further retard the scorch and staining tendency particularly of the more highly branched di-alkyl derivatives of N,N'-dimethyl-N,N'-di(higher sec- or tert-alkyl) p-phenylene-diamines of this invention. Instead of preforming such said salts, the diamines and dibasic acids can be separately incorporated into the elastomer compound to effect the same net result as obtained by incorporating, into the elastomer, the above said salt.

It should be noted that, in the present invention, hydrocarbon substituted phenylene radicals are intended to include heterocyclic (e.g., pyridyl, pyrrolidinyl, pyrrolyl, pyrrolinyl, thienyl, furyl, and the like) substituted hydrocarbons.

GENERAL DESCRIPTION

The research has shown that the new compounds are valuable antiozonants for plastomers and resins as well as for natural and synthetic rubbers and are particularly useful antiozonants for tires and like natural and synthetic products subject to ozone attack at high operating temperatures, such as those temperatures attained by heavy duty truck tires, which temperatures may rise as high as 300° F. in use. Antiozonants are herein defined as additive agents which protect the polymeric material, e.g., natural and synthetic rubbers, against deterioration due to ozone attack. While serving as antiozonants, the new compounds also serve as antioxidants, e.g., the new products of this invention protect against deterioration of tensile properties caused by reaction of vulcanized rubber with oxygen. However, it is preferred to use the new antiozonants in larger amounts when they are used as the sole additive to protect against both oxygen and ozone. The specific class of new compounds of this invention differ from otherwise substituted materials of the class of substituted arylenediamines, in that the new compounds generally favorably effect scorch time and have less tendency to stain light colored stocks.

The new antiozonants comprising Part I of this invention comprise the N,N'-di-(higher sec- and tert-alkyl)-N,N'-dimethyl-p-phenylenediamines and N,N'-di-(higher sec- and tert-alkyl)-N,N'-dimethyl-p,p-diphenylene diamines (diphenylene includes the diphenylene nuclei as above defined) and wherein "higher alkyl" designates $C_8$ to $C_{12}$ alkyl radicals, and the total carbon count of the antiozonant lies in the range of 24 to 37. The preferred new antiozonants are N,N'-dimethyl-N,N'-di(sec-octyl) - p - phenylenediamines and -p,p- 'diphenylenediamines.

Thus the present invention discloses that compounds represented by R—N(CH$_3$)—R'—N(CH$_3$)R" are active antiozonants, in which R and R" are preferably secondary octyl groups and in which R' is a phenylene nucleus and the limitations on carbon count for the compound are from 24 to 37 inclusive.

Specific ranges of this new class of materials are antiozonants when used alone in amounts of about 1 part or more per 100 of the high polymers to be protected and are claimed as such herein. The amounts employed for the oxalates, maleates, fumarates, and the like derivatives of the p-phenylenediamines should be increased to some extent because of the increase in molecular weight of the diamine resultant from conversion to said derivatives.

Part II of this invention discloses synergistic combinations of the antiozonants of Part I hereof both with themselves and with antioxidants and/or waxes.

The antioxidants that show this synergistic effect with the above mentioned antiozonants are members of the following classes: amines and diamines; phenolics; hydroquinones and substituted hydroquinones; organic phosphites; aromatic esters; and thioamides.

The waxes found useful in developing synergistic antiozonant activity are the paraffin waxes and microcrystalline waxes and blends thereof.

This second part of the present invention thus comprises the discovery that highly active synergistic antiozonant compositions can be prepared from any of the antiozonants of Part I of this invention when used in lesser amounts than above stated, and even in amounts less than 1 part/100 parts of the high polymer to be protected, in combination with suitable proportions of known rubber antioxidants and/or certain thioamide antioxidants and/or waxes.

Further this invention includes the incorporation of the new antiozonants of Parts I and II of this invention into high polymeric materials and into latices thereof, and the ozone resistant products therefrom.

It is the applicant's hypothesis that migration of the antiozonants of this invention is necessary to prevent ozone crack initiation at the air-rubber interface, and that the ability of the antiozonant to migrate is curtailed when the number of carbon atoms constituting the antiozonant is in excess of about 37, and further that when the number of carbon atoms in said antiozonant is too small the additives migrate to the surface of the rubber compound and are lost by volatilization from heating or simple aging, and thus cannot protect the product. For effective antiozone activity the single factor of volatility cannot be considered by itself, since compatibility, migratability and volatility of the diamine antiozonant of this invention are important interdependent characteristics. Thus certain antiozonants persist longer in elastomer compounds than other active less volatile members of the present invention. Also certain antiozonants show better protection after aging than before aging, which could not occur if volatility of the antiozonant were the sole determinant. Regardless of the mechanism of protective action or the reasons therefor, it has been discovered by the present inventor that the compounds of the present invention in which the carbon atom count lies within the range of 24 to 37 and in which there are two methyl and two higher sec- or tert-alkyl substituents, selected from the octyl and higher homologous radicals, one methyl on each of N and N' of the p-arylene diphenyleneamine and one said higher alkyl on each of N and N', represents the class of compounds of this invention which are effective as antiozonants with low scorch and low staining characteristics.

To illustrate the observed critical nature of the number of carbon atoms in the alkyl substituents, and to show how such observed data fits the above hypothesis, there is presented herewith a diagram (FIGURE 2) showing the virtual immunity (measured by the "A value" procedure herein explained) of GR–S 1500 type synthetic rubber protected from ozone cracking by 5 parts of antiozonants represented by R(CH$_3$)N—R'—N(CH$_3$)R" wherein R' is a phenylene or diphenylene nucleus R and R' are sec- or tert-octyl radicals and when the total number of carbon atoms in the antiozonant is at least 24 and not more than 37, i.e., the limits of total carbons of the phenylene and diphenylene nuclei, either substituted or unsubstituted, lies within the range of 6–19 for said antiozonants wherein 18 carbons are included for the methyl and octyl substituents on the nitrogens, when the carbon count is better than obtained in the control compound. In this diagram an "A value" of 50 or less represents virtual immunity from ozone attack; while at an "A value" above 500, the samples are not considered an improvement over the usual Santoflex AW antioxidant control compound simultaneously exposed to ozone during the period of dynamic testing. When "A values" are obtained that lie from about 50 to 500 the specimens show an improvement in relation to the control compound, i.e., the antiozonants show relative effectiveness for ozone protection in the range above virtual immunity but still better than the control. The line "X" represents the limit of the low-staining and low-migration characteristics of the antiozonants of the present invention; the line "Y" represents the loss of immunity to ozone attack when the ability of the antiozonants to migrate to the surface is inadequate. The area between W and X applies to active antiozonants which do not have the advantages above noted with respect to stain and scorch.

Similar figures for other categories of the presently discovered new antiozonants have been drawn showing the relation of activity to carbon count (e.g., for higher alkyl groups above C$_8$, and for diphenylene nuclei, unsubstituted and hydrocarbon substituted) but are omitted herefrom for the sake of brevity.

It has thus been found that N,N-dimethyl substituted N,N'-sec- and tert- higher alkyl-p-phenylenediamines are likewise active antiozonants with added advantages of improved scorch and staining properties in comparison to the parent diamines. FIGURE 1 is a chart drawn for three of the new antiozonants demonstrating antiozonant protection of GR–S in presence of a small amount of antioxidant added at the polymer plant (curves A, B and D). Curve C is included for comparison to show the lesser activity of the N,N'-dimethyl-N,N'-di-primary octyl-p-phenylene in relation to the activity of the sec- and tert-octyl analogues of the present invention, the primary derivatives not being able to impart virtual immunity to GR–S either aged or unaged.

With the small amount of antioxidant (such as 1.25 parts phenyl-beta-naphthylamine) that is ordinarily incorporated at the rubber manufacturing plants, substantially the same quantities of the antiozonant are required to obtain virtual immunity from ozone attack. However, the present research has shown that with larger quantities of antioxidants present that per se have no appreciable antiozonant effect, a synergism is developed and lesser quantities of the antiozonants will then give virtual immunity to ozone attack in static or dynamic usage. Similarly, present research has shown that up to 3 pts. of certain waxes act synergistically with the antiozonants particularly in static usages. The synergism of heavy metal salts in combination with the antiozonants of the first part of this invention (e.g., fatty acid salts (C$_3$–C$_{12}$), rosin acids and naphthenic acid salts of heavy metals such as lead, tin, manganese, cobalt, nickel and iron) shows that protection against ozone attack may be obtained with as little as 0.5 part of the antiozonant material, so used.

The amounts of synergistic rubber antioxidants and/or waxes used in these synergistic combinations of Part II of this invention may vary with the specific antioxidant and/or wax, but in general are in the range of 0.5 to 7.5 parts/100 parts of elastomer. Expressed in terms of the proportions of the synergistic composition, such composition thus may comprise from 1 to 9 parts of antiozonant for rubber, from 0 to 9 parts of antioxidant for rubber, and from 0 to 9 parts wax, per 10 parts of the synergistic composition.

The amine type antioxidants which, in combination with the substituted phenylenediamines of the present invention, produce good antiozonant compositions for elastomers and elastomer combinations, as above noted, include conventionally used amine antioxidants, amine-carbonyl-condensation products, tetrahydroquinoline derivatives and the like. More specifically the antioxidants tested for forming synergistic antiozonant combinations with the appropriately substituted phenylenediamines are set forth in Table A below; the synergistic waxes include paraffin and microcrystalline waxes and blends thereof.

The new antiozonants and/or the synergistic antioxidants and/or waxes can be appropriately incorporated (e.g., per se if liquid, or as an emulsion if solid) into the elastomer. For example they may be added to the elastomer latex so that the final coagulated elastomer composition contains the desired antiozonant or components of the synergistic antiozonant compositions of this invention, whichever is desired. The elastomer latex may then be coagulated either in the conventional procedures, such as with salt-acid, glue, alum, etc., or with tin and/or iron group salts as described in copending U.S. application, S.N. 523,711, filed July 22, 1955, when the advantages thereof are desired.

The new antiozonants of this invention and their combinations for combining with elastomers at the elastomer production plant can be dissolved in an appropriate solvent as, for example, a hydrocarbon solvent like pentane, hexane, rubber solvent, etc.; an aromatic solvent like benzene, hexane, etc.; a ketone like acetone, diethyl ketone, ethylmethyl ketone, etc.; an alcohol like methanol, ethanol, isopropanol, etc. Thus, solutions of the new antiozonants can be proportionately added to the elastomer latex, to the coagulated elastomer crumb, or even during the filtering of the wet elastomer crumb, or to the crumb after filtration.

*Table A*

ANTIOXIDANTS SHOWING SYNERGISM WITH ANTIOZONANTS

Amines:
    6-ethoxy-2,2,4-trimethyl-1,2-dihydroquinoline (Santoflex AW)
    2,2,4-trimethyl-1,2-dihydroquinoline polymer (Age-Rite Resin D)
    Diphenylamine-acetone condensation products (BLE–25) (Flectol H)
    Phenyl-beta-naphthylamine (PBNA)
    Phenyl-alpha-naphthylamine (PANA) (Neozone A)
    Aniline-acetone reaction products
    Aniline-butyraldehyde reaction products (e.g., Antox)
    Di-alpha-naphthylamine
    Di-beta-naphthylamine
    o-, m-, and p-Phenylenediamines
    p,p'-Diaminodiphenylmethane (Tonox)
    p-Aminodiphenylamine
    1,2-dianilinoethane (diphenylethylenediamine)
    o-Tolidine
    N,N'-diphenyl-p-phenylenediamine (Perflectol X)
    The naphthylenediamines
    Di-p-methoxydiphenylamine (Thermoflex)
    N,N'-di-sec-butyl-p-phenylenediamine (Tenamene 2)
    N,N'-di-beta-naphthyl-p-phenylenediamine (AgeRite White)
    N,N'-di-beta-ac - tetrahydronaphthyl-p-phenylenediamine
    N,N'-di-alpha-naphthyl-p-phenylenediamine
    Tetraethylenepentaminopropionitrile (Amitrile 1–T)
    Mixture of isopropoxydiphenylamine, diphenyl-p-phenylenediamine and phenyl-beta-naphthylamine (AgeRite Hipar)
    Rosinamine D
    Dodecylamine
    N,N'-tetramethyl-p,p'-di(aminophenyl)methane
    N-dimethyl-p-phenylenediamine
    Polycyanohydrocarbonpolyamines of U.S. Ser. No. 566,423, filed Dec. 30, 1955.

Phenolic:
    Parazone (p-phenyl phenol)
    Santovar O (2,5-di-tert-butyl hydroquinone)
    Hydroquinone
    Antioxidant 2246 (a p,p'-bisphenol)
    Santowhite Flakes (a dibutyl-phenol sulfide)
    Santovar A (2,5-di-tert-amylhydroquinone)

Phosphites:
    Triphenyl phosphite
    Tri(nonylphenyl)phosphite (Polygard)

Aromatic esters:
    Glycerol monosalicylate ester
    Dipropylene glycol monosalicylate ester Thioamides:
    Thioacetanilide
    Thiocarbanilide
    Thioacetamide
    Dibenzylthiourea
    Phenylacetothiomorpholide

PREPARATION AND TESTING PROCEDURES

The procedure employed in compounding and testing the elastomer-amino-additive compositions for the examples of Tables I, II, and III herein was as follows: as control samples "cold" GR–S synthetic rubber (GR–S 1500 polymerized at 41° F. or GR–S 1600 which is the same except that 50 parts HAF carbon black are incorporated at the polymer plant), neoprene WHV, Hycar 1014, Butyl and natural rubber were compounded and vulcanized according to best known commercial practices to obtain good aging properties. Then similar compounds were prepared and vulcanized with our new antiozonants present as additives. The recipes employed for the several elastomer compounds were as follows:

| Elastomer (100 parts) | Neoprene Type WHV | Nitrile rubber-Hycar 1014 | Natural rubber | Butyl GR-I-17 | GR-S (cold) |
|---|---|---|---|---|---|
| INGREDIENTS [1] | | | | | |
| Philblack "0" (carbon black) | | | | | 50 |
| Thermax (carbon black) | 150 | | | | |
| Statex 125 (carbon black) | | 40 | | | |
| Micronex W-6 (carbon black) | | | 50 | 65 | |
| Zinc oxide | 5.0 | 3.0 | 3.0 | 5.0 | 3.0 |
| Stearic acid | 0.5 | 1.0 | 2.5 | 3.0 | 1.5 |
| PBNA | | | 1.0 | | |
| BLE-25 | | 1.5 | | | |
| Neozone A | 2.0 | | | | |
| Medium pine tar | | | 4.0 | | |
| TP-90B (plasticizer) [2] | | 16.0 | | | |
| Dioctylphthalate (plasticizer) | 30.0 | | | | |
| ParaFlux 2016 [3] | | | | | 3.5 |
| Circo light oil (Sun Oil Co.) | | | | 20 | 3.5 |
| Atlantic 1115 wax | 0-1.5 | 0-1.5 | 0-1.5 | 0-3.0 | 0-3.0 |
| Light calcined MgO | 4.0 | | | | |
| Altax [4] | 0.5 | 1.5 | 1.0 | 0.5 | |
| Monex [5] | 0.5 | | | | |
| Methyl tuads [6] | | | | 1.0 | |
| Santocure [7] | | | | | 1.25 |
| Sulfur | 0.5 | 1.5 | 2.5 | 2.0 | 2.0 |
| Antiozonant and other additive [8] | | | | | |

[1] Curing ingredients described in "Compounding Ingredients for Rubber," 2nd edition, published by India Rubber World, 1947.
[2] High molecular weight polyether sold by Thiokol Corporation.
[3] Saturated polymerized hydrocarbon sold by C. P. Hall Company.
[4] Benzothiazyl disulfide.
[5] Tetramethyl thiuram monosulfide.
[6] Tetramethyl thiuram disulfide.
[7] N-cyclohexyl-2-benzothiazole sulfenamide.
[8] As shown.

In certain cases other waxes were substituted for the Atlantic 1115 of the above formulae. For example Sunproof, Heliozone and Witco 127 were found to be effective but not entirely equivalent in synergistic activity in combination with the antiozonants of the present invention.

For neoprene and Butyl rubber the plasticization required for low temperature performance results in nullifying a major portion of the inherent ozone resistance of the polymer itself, and accordingly the antiozonants of the present invention are useful in such neoprene and Butyl stocks.

These various elastomer samples were cured at about 1000 p.s.i. in a steam heated press at 285° F. with curing times adjusted in the range from 30 to 120 minutes, as required to obtain optimum tensile properties for each specific compound. Samples of each of the cured stocks were heat-aged for 24 to 48 hours at 100° C. and were then subjected to ozone exposures in both dynamic and static tests. The aging procedure employed was the test tube method designated as ASTM method D–865–54–T.

The examples in the tables herein are limited to sulfur-cured vulcanizates; however, sulfurless curing systems, for example with tetramethylthiuram disulfide, peroxide curing systems such as with dicumyl peroxide, benzoquinone dioxime, radiation curing systems, metal oxide curing of acid elastomers as for example zinc oxide and butadiene-acrylic acid copolymers and other curing systems can be used effectively with elastomers containing the antiozonants and synergistic antiozoant compositions.

The dynamic ozone test was conducted on ½-inch dumbbell specimens of the vulcanizates. The exposure to ozone was carried out in an aluminum-lined ozone cabinet where the concentration of ozone was usually held at 50±5 p.p.h.m. of air by passing 6 volumes of ozonized air/cabinet volume/minute. This high ozone concentration is used (25±5 p.p.h.m. is specified by ASTM test D–1149–55T) to demonstrate the protective effect of the antiozonants in a reasonably short time of evaluation and to approximate the atmospheric ozone concentrations reported at ground level under certain climatic conditions in the Los Angeles area and parts of New Mexico and Alaska. Occasionally more highly accelerated ozone exposure tests were conducted by employing ozone concentrations as high as 150 p.p.h.m. With such high ozone concentrations much shorter times are required to obtain valid comparisons of the protective action of the additives under test (e.g., about 8 hours). Each sample was stretched and relaxed continuously at a rate of 30 times per minute, between 0 and 20% elongation of the total sample (0 to 28% elongation based on the narrow portion suffering the elongation) to simulate conditions of dynamic use of the rubber. After each test, usually of 40 to 70 hours' duration, a specimen taken from the center part of the narrow portion of the dumbbell was placed under the microscope and the depth of the observed cracks was measured. The depths of the deeper 50% of the observed cracks were averaged, and this average was designated the "A value" and was taken as the index of ozone attack. With each group of 5 to 25 experimental samples, control samples containing Santoflex AW were simultaneously subjected to the same dynamic ozone test, and the average crack depth "A value" was compared with the "A value" for the crack depths of the control samples as a basis of evaluation.

In the research on which this application has been based, it has been demonstrated that where antiozone protection is obtained in the dynamic tests, protection is also afforded in static use. The static tests run on both heat-aged and unaged samples showed this to be true without exception. (The converse is not always true, e.g., some static protection is afforded by paraffin and microcrystalline waxes, which are valueless for protection of rubber articles subjected to dynamic usages). Specimens for static testing were mounted in accordance with ASTM procedure D–518–44, method B. The mounted samples were placed in the ozone exposure cabinet wherein the ozone concentration was held at a concentration of 25±5 p.p.h.m. or 50±5 p.p.h.m. at a temperature of 40° C. In this static test the samples were observed periodically and the time was measured to the appearance of the first crack. Since such static test data are merely confirmative of data obtained dynamically, static ozone exposure tests for the antiozonants of the present application are omitted herefrom for the sake of brevity. It suffices to state that long continued tests show that where virtual inmunity against ozone was obtained with an antiozonant or a synergistic antiozonant composition in a 70-hour test at 25±5 p.p.h.m. of ozone or a 40-hour test at 50±5 p.p.h.m. of ozone, static protection of 3 months to one year was obtained at ozone concentrations of 50 p.p.h.m. without failure of the samples. The Santoflex AW controls (2 pts. Santoflex AW) showed severe cracking in the 70-hour test and failed in about 100 hours or less under the same static test conditions.

Similarly mounted panels of specimens (ASTM procedure D–518–44) were also statically tested in outdoor weather experiments in Florida (Miami), California (Los Angeles), and Michigan (Detroit). In California, where highest concentrations of ozone occurred over the time of the test (varied from 5 to 60 p.p.h.m. dependent on weather variations), up to six mounths of outdoor exposure were required to develop cracks (ASTM rating 4) in the samples containing antiozonants or synergistic antiozonant compositions. The Santoflex AW controls not only cracked but failed in a month under simultaneous exposure. In the Florida and Michigan tests the protected samples did not crack in a one-year test whereas the control samples not only cracked but failed in the same test. The rating method for the static exposure tests is shown by the following tabulation:

| Rating | Development of static tests |
| --- | --- |
| 0 | No development of any kind. |
| 1 | Microscopic cracking. |
| 2 | Fine visible cracking. |
| 3 | Pronounced visible cracking. |
| 4 | Severe visible cracking. |

Scorch data were obtained according to ASTM method D–1077–55T employing a Mooney viscometer. Scorch tendency indicates the tendency of the additives in a rubber compound to accelerate vulcanization of the compound during processing (e.g., during milling, extruding, etc.) prior to the conventional curing step. If an additive is too "scorchy" the compound cures to such a degree that it cannot be mold- or press-cured to intended useful end items. Scorchiness, although often corrected by use of cure retarders, low sulfur and low-accelerator recipes, is not desirable in any type of rubber additive, and accordingly an ASTM method, already established to measure scorch, was employed to evaluate the antiozonants of the present invention with respect to scorchiness.

The scorch time is defined as the number of minutes required as measured from the start of the test, for the rubber compound to increase a specified number of points in viscosity (on a Mooney viscometer scale) above the minimum viscosity recorded when operating the Mooney viscometer at a fixed temperature selected preferably in the range of 250° to 300° F. In the present tests five points in viscosity was used as the specified number of viscosity points, and the temperature of test was set at 250° F.; these specifications were selected in accord with the most generally reported practice in the tire manufacturing industry. A 20 minute scorch time is considered a minimum for tire stocks with 22 to 25 minutes or more being preferred by industry.

Discoloration tendency and stain and migration of the antiozonants of this invention were measured in accordance with ASTM procedure D-1148-55 and D-925-55 respectively, and also a modification of the last method employing white natural rubber stock strips in place of the white painted panels of the unmodified D-925-55B. This discoloration tendency of elastomer additives is important where light colored elastomer compounds are desired, e.g. for white sidewall tires, seals and gaskets for white enamel articles such as refrigerator doors, white instrument panels, etc. Thus, antiozonants should be non-staining signifying that they will not result in discoloration of white products which either incorporate the said antiozonants or are in contact with compounds incorporating them.

The tendency to discolor white articles was measured in this work by painting a compound containing the antiozonant with a white paint and exposing the sample to a sunlamp for 24 hours. The lamp, temperature of test, type of paint, rating of samples, etc., were as specified in said ASTM method D-1148-55. The ratings employed in the staining and discoloring tests were as follows:

Very dark
Dark
Medium
Light
Very light

The control (2 parts Santoflex AW in GR-S 1500) rated "dark." GR-S 1502 contains a non-staining antioxidant (e.g., tri(nonylphenyl) phosphite) added at the polymer plant, and was used as the stock for measuring staining tendency of the new antiozonants.

Tendency toward contact staining and migration staining was measured according to ASTM D-925-55 using the specified light source. The elastomer samples containing antiozonants of the present invention were contacted with white enamel-coated panels, and also with squares of white natural rubber stock designed for white sidewalled tires. These panel-rubber and white rubber-experimental samples were exposed to the sunlamp for 24 hours, and the contacted white surface was observed to detect stain from the antiozonant, and to detect any migration outward from the area of direct contact with the experimental sample. Ratings for stain were the same as for the discoloration test (see above), while migration was noted as: much, medium, little, very little, or none.

SYNERGISM

In more detail, the second part of the present invention comprises the discoveries of antiozonant compositions which rely on the action of synergistic antioxidants, paraffin and/or micro-crystalline waxes in combination with specific derivatives of p-phenylenediamines of the present invention in which there are four hydrocarbon substituents on the amino nitrogens. When used in more than 3 parts per 100 parts of elastomer the said derivatives of p-phenylenediamine give virtual immunity to ozone attack per se. However, in combinations with 1.5 to 6 pts. of certain antioxidants or mixtures of antioxidants it has been found that reduced amounts (e.g., 0.5 to 3 parts) of the said specific p-phenylenediamine derivatives serve to protect elastomers against ozone deterioration, although the antioxidants by themselves do not impart ozone resistance to the elastomer compounds, nor do the reduced amounts of said specific diamino derivatives alone (i.e., in the absence of the specific antioxidants) show adequate protection of the elastomer compounds. Such admixed and/or interacted components which develop antiozonant activity in protection of elastomers and plastomers are termed herein "synergistic compositions."

Thus I have made the discovery that certain antioxidants identified herein (see Table A) themselves incapable of protecting elastomers and plastomers against ozone, have the property of greatly increasing the effectiveness of reduced amounts of my specific antiozonants in elastomer and plastomer compositions. Such antioxidants I refer to herein as "synergists."

An alternative interpretation of my invention is that a small amount of diamino derivative, which itself can impart ozone resistance to elastomer and plastomer compositions incorporating said derivative in certain minimum amounts can develop antiozone activity in antioxidants when admixed therewith in less than such minimum amounts.

The mechanism of the action of such antioxidants in synergistic antiozonant composition is not entirely understood. On possible explanation is that the diamino antiozonants themselves may either react with certain of the rubber compounding ingredients or may enter to some extent into the complex vulcanization reactions in the curing of the elastomer compositions, and that the synergistic antioxidant and/or heavy metal salt and/or wax alters the degree to which the diamino antiozonant so enters the side reaction or vulcanization reaction; or the antioxidant may improve the migratability of the diamines. However, the exact mechanism is immaterial to the practice of the invention which the subsequently discussed data serve to exemplify.

It is also apparent that the wax component is a contributory component of some of the synergistic compositions in GR-S (Examples A-1, -2, -10, -11 and -14). Also virtual immunity resulted in an "aged" sample with 3 parts of the N,N'-dimethyl derivative of N,N'-di-2-octyl-p-phenylenediamine antiozonant in neoprene WHV (Examples C-18 herein) with 2.0 parts neozone A and 1.5 pts. wax (Atlantic 1115); whereas with the same amounts of the antiozonant and neozone A but with no wax virtual immunity was not attained (Example C-17). Data showing the synergistic effect of wax with other antiozonants of the present invention while similar have been omitted for the sake of brevity.

I have found that while paraffin and microcrystalline wax and combinations thereof per se give some protection to static samples of vulcanized elastomers no protection is afforded vulcanized elastomers in dynamic usage. My findings confirm John O. Cole. In G. S. Whitby's treatise entitled "Synthetic Rubber," published in 1954 by John Wiley and Sons, Inc., New York City, on page 541, Mr. Cole states, "It should be pointed out that, under dynamic flexing, wax offers no protection to either GR-S or natural rubber" from the deterioration by ozone.

In contrast to this fact I have shown that waxes when used with the antiozonants of this invention can act synergistically, that is, can enhance the protective value of the antiozonants.

Example A-14 in comparison with A-11 shows the beneficial synergistic effect of a heavy metal soap, a salt of a fatty acid. (The GR-S 1605 test compounds used in these two examples were found to be similar in ozone resistance to GR-S 1500 compounds (compare with Example A-5).) The GR-S 1605 compound contains elastomer identical with that of GR-S 1500 and 1600 compounds and differs from them in that (1) it contains a medium abrasion furnace black (Philblack A added at the polymer plant instead of the high abrasion furnace black, Philblack O), and (2) it contains Polygard (about 1 part) added at the polymer plant, a non-staining antioxidant, instead of the PBNA or BLE-25, staining antioxidants added to GR-S 1500 and 1600 at the polymer plant. It was also demonstrated (see below under "Further Discussion of Results") that Polygard, BLE-25 and PBNA are less active synergistic antioxidants and compounds containing such antioxidants at a level less than 1.5 parts/100 parts elastomer can be used to obtain comparative evaluations of antiozonant compositions therein.

It has been further demonstrated that similar but not identical beneficial synergistic effects are obtained with antiozonant diamines of the present invention by combination with other heavy metal soaps wherein the acid component is derived from fatty acids (from 3 to 19 carbon atoms) naphthenic acids (from 6 to 20 carbon atoms) or rosin acids, disproportionated rosin acids, hydrogenated rosin acids, or the like, and wherein the heavy metal is tin, lead, manganese, cobalt, nickel or iron. The data for such synergistic compositions, details of which are omitted herefrom for the sake of brevity, demonstrated that, in the absence of synergistic antioxidants (other than the insignificant amounts present from the polymer plant) 2 parts of diamine antiozonants of the present invention can give virtual immunity to the aged elastomer compounds when 1 to 2 parts of such heavy metal salt are combined therewith. When combined with 2 to 6 parts of appropriate synergistic antioxidants together with 1 to 2 parts of the heavy metal salts, as little as 0.5 to 1.5 pts. of the diamine antiozonants of the present invention are adequate to attain virtual immunity for the aged elastomer compound.

In addition to synergism demonstrated herein for antioxidant-antiozonant admixtures, it has also been found advantageous to combine one or more different antiozonants of this invention with one or more antiozonants of other inventions, e.g., those taken from U.S. Patent 2,705,224. In Example B-1 1 part of N,N'-di-2-octyl-N,N'-dimethyl-p-phenylenediamine combined with 2 parts of N,N'-tetraisobutyl-p-phenylenediamine shows unexpected improvements over either individual additive in (1) protection of polymers against ozone (Examples B-2 and -3), (2) anti-scorch tendency (see examples of Table II), (3) anti-staining tendency (see examples of Table III), and (4) age resistance. Age resistance, not exemplified in the tables, was evidenced by better retention of tensile strength and elongation after aging 72 hours at 100° C. in the test tube method (ASTM method D-865-54-T) then shown by compounds prepared with 3 parts of either individual antiozonant.

OBSERVED RESULTS

Table I shows data for the dimethylated antiozonants of this invention in comparison with non-methylated parent di (sec- and tert-octyl)-p-phenylenediamines in several elastomers subjected to the dynamic ozone exposure test. GR-S and natural rubber samples containing Santoflex AW were tested simultaneously with each group respectively of GR-S 1500 and natural rubber samples containing the amino compounds of the present invention to monitor the procedure and to give assurance that the several results were valid for evaluating the relative effectiveness of the several amino compounds for protection of the several elastomers against ozone attack. Santoflex AW shows no protective action against ozone for Hycar 1014, neoprene and Butyl rubber and accordingly was not incorporated into the control compounds thereof.

Ortho- and meta-diamino aromatic compounds are relatively inactive as antiozonants, also certain compounds, such as phenyl-alpha-naphthylamine, di-beta-naphthylamine, hydronaphthylamine derivatives, although good antioxidants are not good antiozonants.

It should also be called to attention that the GR-S 1500 examples of Table I contained about 1.25 parts of either phenyl-beta-naphthylamine (PBNA) or a diphenylamine-acetone condensation product (BLE-25) in addition to the other additives shown.

*Table I*

ELASTOMERS CONTAINING ANTIOZONANTS OF THE PRESENT INVENTION

[Accelerated dynamic exposure: ozone at 50±5 p.p.h.m.; 40 hrs.; 40° C.; 30 flexures/min.]

| Example | Sample | Elastomer | Pts. | Additives* | Pts. wax | "A Value" crack depth (microns) | |
|---|---|---|---|---|---|---|---|
| | | | | | | Unaged | Aged 24 hours at 100° C. |
| GROUP A | | | | | | | |
| 1 | Z-4 | GR-S 1500 | 5 | N,N'-dimethyl-N-N'-di-2-octyl-p-phenylenediamine | 1.0 | 0 | 0 |
| 2 | V-30 | do | 5 | do | 0 | 5 | 10 |
| 3 | BE-29 | do | 3 | do | 0 | 25 | 80 |
| 4 | BE-30 | do | 3 | do | 1.5 | | 70 |
| 5 | W-41 | do | 2 | do | 1.5 | 90 | 125 |
| 6 | BF-34 | do | 2 | N,N' - dimethyl - N,N'-di(1 - ethyl - 3 - methylpentyl) - p - phenylenediamine. | 0 | 85 | 65 |
| 7 | BF-7 | do | 3 | do | 0 | 55 | 40 |
| 8 | Control¹ | do | 3 | N,N'-di-2-octyl-p-phenylenediamine | 0 | 50 | 80 |
| 9 | do¹ | do | 3 | N,N'-di-(1-ethyl-3-methylpentyl)-p-phenylenediamine | 0 | 45 | 100 |
| 10 | BF-30 | GR-S 1605 | 2 | N,N'-dimethyl-N,N'-di-2-octyl-p-phenylenediamine | 0 | 110 | 120 |
| 11 | BF-31 | do | 2 | do | 1.5 | 100 | 110 |
| 12 | BF-32 | do | 2 | N,N, - dimethyl - N,N' - di(1 - ethyl - 3 - methylpentyl) - p - phenylenediamine. | 0 | 130 | 120 |
| 13 | Control | GR-S 1500 | 2 | Santoflex AW | 1.5 | 200 | 300 |
| 14 | BP-36 | do | 2 | N,N'-dimethyl-N,N'-di-2-octyl-p-phenylenediamine plus 1 part stannous stearate. | 1.5 | 70 | 20 |
| GROUP B | | | | | | | |
| 1 | Z-5 | do | 1 | N,N'-dimethyl-N,N'-di-2-octyl-p-phenylenediamine plus 2 pts. N,N'-tetraisobutyl-p-phenylenediamine. | 0 | 100 | 50 |
| 2 | Control² | do | 3 | N,N'-tetraisobutyl-p-phenylenediamine | 0 | 130 | 150 |
| 3 | Z-7 | do | 1 | N,N'-dimethyl-N,N'-di-2-octyl-p-phenylenediamine | 0 | 300 | 250 |
| 4 | Control³ | do | 3 | N,N'-dimethyl-N,N'-di-(2-ethylhexyl)-p-phenylenediamine | 0 | 85 | 110 |
| 5 | do² | do | 5 | do | 0 | 70 | 95 |
| 6 | do² | do | 3 | N,N'-di(2-ethylhexyl)-p-phenylenediamine | 0 | 70 | 130 |
| 7 | do² | do | 5 | do | 0 | 40 | 55 |
| 8 | P-96 | do | 5 | Oxalate of N,N'-dimethyl-N,N'-di-2-octyl-p-phenylenediamine. | 1.5 | 50 | 100 |
| 9 | P-97 | do | 3 | N,N' - dimethyl - N,N' - di(1,1,3,3 - tetramethylbutyl) - p - phenylenediamine. | 0 | 110 | 120 |
| 10 | Control | do | 2 | Santoflex AW | 1.5 | 190 | 280 |
| GROUP C | | | | | | | |
| 1 | BF-36 | Natural rubber | 3 | N,N'-dimethyl-N,N'-di-2-octyl-p-phenylenediamine | 0 | 65 | 130 |
| 2 | BF-37 | do | 3 | do | 1.5 | 55 | 100 |
| 3 | BF-38 | do | 3 | N,N' - dimethyl - N,N' - di(1 - ethyl - 3 - methylpentyl) - p - phenylenediamine. | 0 | 75 | 80 |

Table I—Continued
ELASTOMERS CONTAINING ANTIOZONANTS OF THE PRESENT INVENTION
[Accelerated dynamic exposure: ozone at 50±5 p.p.h.m.; 40 hrs.; 40° C.; 30 flexures/min.]

| Example | Sample | Elastomer | Pts. | Additives* | Pts. wax | "A Value" crack depth (microns) Unaged | Aged 24 hours at 100° C. |
|---|---|---|---|---|---|---|---|
| 4 | BF-39 | do | 3 | do | 1.5 | 55 | 80 |
| 5 | BF-40—Control³ | do | 3 | N,N'-dimethyl-N,N'-di-(2-ethylhexyl)-p-phenylenediamine | 0 | 60 | |
| 6 | BF-41 | do | 3 | do | 1.5 | 50 | 150 |
| 7 | Control | do | 3 | N,N'-di-2-octyl-p-phenylenediamine | 0 | 40 | 270 |
| 8 | do | do | 3 | N,N'-di(1-ethyl-3-methylpentyl)-p-phenylenediamine | 0 | 55 | 190 |
| 9 | P-99 | do | 5 | do | 1.5 | 25 | 40 |
| 10 | Control | do | 5 | Santoflex AW | 0 | 85 | 145 |
| 11 | do | do | 5 | do | 1.5 | 325 | 445 |
| 12 | P-98 | Hycar 1014 | 5 | N,N'-dimethyl-N,N'-di-2-octyl-p-phenylenediamine | 0 | 45 | 50 |
| 13 | BF-42 | do | 3 | do | 0 | 80 | |
| 14 | BF-44 | do | 3 | N,N'-dimethyl-N,N'-di-(1-ethyl-3-methylpentyl)-p-phenylenediamine. | 0 | 140 | 150 |
| 15 | BF-46—Control³ | do | 3 | N,N'-dimethyl-N,N'-di(2-ethylhexyl)-p-phenylenediamine | 0 | 75 | |
| 16 | Control | do | None | (1.5 pts. BLE-25 only) | 0 | 700 | 600 |
| 17 | P-6 | Neoprene WHV | 3 | N,N'-dimethyl-N,N'-di-2-octyl-p-phenylenediamine | 0 | 75 | 85 |
| 18 | P-5 | do | 3 | do | 1.5 | 0 | 0 |
| 19 | Control | do | None | | 0 | 280 | 340 |
| 20 | P-10 | Butyl rubber | 3 | N,N'-dimethyl-N,N'-di-2-octyl-p-phenylenediamine | 0 | 50 | 50 |
| 21 | Control | do | None | | 0 | 100 | 80 |

*Natural rubber samples contained 1 pt. PBNA antioxidant; Hycar 1014 contained 1.5 pts. BLE-25 antioxidant, and Neoprene WHV contained 2 pts. Neozone A antioxidant.
¹ For comparison with other group A examples.
² Primary alkyl derivatives for comparison with antiozonants of this invention.
³ Examples containing primary octyl derivatives for comparison with antiozonants of this invention.

The ozone cracking in the case of the Santoflex AW controls for GR-S and natural rubber as well as the neoprene, Hycar and Butyl controls was greatly in excess of the 50 microns "A value" which represents virtual immunity to ozone attack, while the elastomers compounded with appropriate amounts of the antiozonants of the present invention are better than the controls and generally approach or are within the range of that criterion of "A value."

In further comparative studies other new compositions more effective than Santoflex AW for protection of elastomers were discovered which also are represented by the formula R(CH₃)N—R'—N(CH₃)R", in which R' is p,p'-biphenylene, methylenediphenylene, or p,p'-iminodiphenylene and one or both of R and R" are sec- or tert-alkyl groups containing 8 to 12 carbons. Thus derivatives of the N,N'-dioctyl parent antiozonants wherein the hydrogens of the amino groups of the just mentioned antiozonants are substituted by methyl groups, are examples of the present new antiozonants for protection of various elastomers.

Data for specimens prepared from "hot" GR-S (GR-S 1002) were very similar to those for "cold" GR-S set forth in Table I and have therefrom been omitted for the sake of brevity.

In similar compounds the antiozonants of the present invention protect elastomers of various other types against ozone. Thus data for protected and unprotected polybutadiene, Philprene and BD/S/AA (butadiene/styrene/acrylic acid terpolymer), further demonstrate the high effectiveness of the new antiozonants, several of which are exemplified in Table I. Data for the dynamic test of typical antiozonants of the present invention are exemplified in FIGURE 1 for the range of 0 to 5 parts antiozonants in GR-S 1500.

Wax synergism with the new antiozonants is demonstrated by Examples A-1, -2, -10, -11, C-6, C-9 and -17. Synergism obtained with other antioxidants in GR-S 1500 in combination with an antiozonant or this invention is illustrated by B-1, and synergism with a heavy metal soap, by A-14. While data of the same type have been obtained for the other new antiozonants per se and in various synergistic combinations in various elastomers, such similar data although not identical are omitted herein for the sake of brevity since they are merely confirmatory of these disclosures.

A series of elastomer compounds was prepared which conclusively established that the synergistic action with the antiozonants of PBNA (phenyl-beta-naphthylamine) and BLE-25 (acetone-diphenylamine condensation product) in the small quantities commonly introduced at the GR-S rubber plants in relatively insignificant, and that the data based on compositions including commercial GR-S afford a valid basis for evaluation of the antiozonants per se, as well as in synergistic combinations with other more active synergistic antioxidants and/or with significant quantities of PBNA and/or BLE-25.

In FIGURE 2 dynamic ozone exposure data are shown delineating the limitations on the carbon count of the hydrocarbon substituted diamines

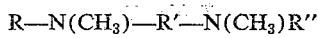

$$R-N(CH_3)-R'-N(CH_3)R''$$

wherein R' is a monophenylene nucleus, unsubstituted or hydrocarbon substituted, and R and R" are sec- or tert-octyl groups. Such curves are also the bases for the similar limitations of the antiozonants of this invention (1) wherein R and R" are sec- or tert-$C_9$ to $C_{12}$ alkyl groups and also (2) wherein R' is a diphenylene nucleus, both unsubstituted and hydrocarbon substituted, and wherein R and R" are sec- or tert-octyl, nonyl, decyl, undecyl or dodecyl groups, but are omitted herefrom for the sake of brevity. The interpretation of FIGURE 2 has been considered more fully hereinbefore.

In static samples it has been demonstrated that the addition of from 1 to 5 parts of the new antiozonants of this invention increases the time preceding appearance of the first ozone cracks as much as 100-fold over the time of appearance of first cracks in the synthetic rubber controls containing Santoflex AW. Static data being merely confirmatory and cumulative of the effects herein demonstrated have been omitted for the sake of brevity.

Finally the data for elastomer compounds show among other things, (1) the limits for the antiozone effective range of carbon atoms in the new antiozonants containing hydrocarbon substituted phenylene and diphenylene nuclei, (2) the synergistic effect of antioxidants, and (3) the effectiveness of these diamine antiozonants even when both nitrogens are hydrocarbon disubstituted as herein delineated. "Hydrocarbon substituted" is meant to include heterocyclic substituted as well as aliphatic, alicyclic and aromatic hydrocarbon substituted as mentioned hereinbefore.

Examples of Table I demonstrate that in the antiozonants of this invention substituent methyl radicals can replace both remaining hydrogens of the parent N,N'-di(sec- and tert-octyl)-p-phenylene-diamine antiozonant without detracting from the antiozonant activity of the latter, the higher molecular weight notwithstanding, and show the added advantages of decreased scorch and less staining tendency (Tables II and III).

As mentioned under methods of test, data for static ozone tests and for outdoor weathering tests confirm the dynamic test results with regard to the antiozonant compositions of the present invention, but as such tests are less stringent than the dynamic test and as such data are only cumulative they have been omitted herefrom for brevity.

Data of Table II herein exemplified improvement of the scorch time of the GR–S evaluation compound containing the new experimental antiozonants in comparison with control GR–S 1500 samples. Example containing 3 pts. of the parent diamine, N,N'-di-2-octyl-p-phenylenediamine, showed a scorch time of 20 minutes (Example 4). The dimethylated derivative of this compound, an antiozonant of this invention, in Example II–6 showed 30 minutes scorch time. The improvement in scorch time, realized in every case for the new antiozonants of this invention including the N,N'-di-(sec- and tert-nonyl)- to N,N'-di(sec- or tert-dodecyl)-(inclusive)-p-phenylenediamines in comparison with the parent N,N'-di(sec- or tert-alkyl)-p-phenylene diamines, is amply demonstrated by the data obtained, and further data are omitted herefrom for the sake of brevity.

The improvement in staining and migration tendency of the N,N'-dimethylated derivatives (of the present invention) of the parent N,N'-di(sec- and tert-alkyl) substituted diamines is illustrated by the data of Table III. As in the case of the scorch tendency, the N,N'-dimethyl derivatives (of the present invention) of the parent N,N'-di(sec- and tert-alkyl)-p-phenylenediamine in every case showed less stain than the parent compounds. The new compounds show light to very light stain or coloration in every case. The order of improvement is demonstrated amply by the data of Table III so that further data are omitted herefrom in the interest of brevity.

Table II

SCORCH TIMES MEASURED AS MINUTES IN MOONEY VISCOMETER AT 250° F. TO INCREASE OF 5 POINTS IN VISCOSITY ABOVE THE MINIMUM VISCOSITY (ASTM METHOD D–1077–55–T), GR–S 1500 COMPOUNDS WITH 1.5 PTS. WAX

| Example No. | Pts. | Additives | Scotch time, min. |
|---|---|---|---|
| 1. Control | 5 | N,N'-di-2-ethylhexyl-p-phenylene-diamine | 26 |
| 2 | 5 | N,N'-dimethyl-N,N'-di(2-ethylhexyl)-p-phenylenediamine | 30 |
| 3. Control | 2 | N,N'-di-2-octyl-p-phenylenediamine | 22 |
| 4. Control | 3 | N,N'-di-2-octyl-p-phenylenediamine | 20 |
| 5 | 2 | N,N',dimethyl-N,N',di-2-octyl-p-phenylenediamine | 31 |
| 6 | 3 | N,N'-dimethyl-N,N'-di-2-octyl-p-phenylenediamine | 30 |
| 7. Control | 2 | N,N',di-(1-ethyl-3-methylpentyl)-p-phenylenediamine | 30 |
| 8. Control | 3 | N,N'-di-(1-ethyl-3-methylpentyl)-p-phenylenediamine | 27 |
| 9 | 2 | N,N',dimethyl-N,N',di(1-ethyl-3-methylpentyl)-p-phenylenediamine | 43 |
| 10 | 3 | N,N'-dimethyl-N,N'-di(1-ethyl-3-methylpentyl)-p-phenylenediamine | 44 |
| 11. Control | 3 | Mono-oxalate of N,N'-di-2-octyl-p-phenylenediamine | 33 |
| 12. Control | 3 | Mono-oxalate of N,N'-di-(1-ethyl-3-methylpentyl)-p-phenylenediamine | 43 |
| 13 | 3 | Mono-oxalate of N,N'-dimethyl-N,N'-di-2-octyl p-phenylenediamine | 34 |
| 14 | 3 | Mono-oxalate of N,N'-dimethyl-N,N'-di-(1-ethyl-3-methylpentyl)-p-phenylenediamine | 45 |
| 15 | 3 | Mixture of 1 part N,N'-dimethyl-N,N'-di-2-octyl-p-phenylenediamine and 2 parts N,N'-tetraisobutyl-p-phenylene-diamine | 35 |
| 16. Control[1] | 3 | N,N'-tetraisobutyl-p-phenylenediamine | 34 |

[1] For comparison with Examples 6 and 15.

Table III

IMPROVEMENT IN STAINING AND MIGRATION CHARACTERISTICS OF ANTIOZONANTS PREPARED BY ALKYLATION OF PARENT DIAMINE COMPOUNDS OF THE PRESENT INVENTION IN GR–S 1502 ELASTOMER*(ASTM METHOD D–1148–55 AND D–925–55)

| Sample | Pts. | Antiozonant | Stain | Migration |
|---|---|---|---|---|
| Control 1 | 2 | N,N'-di-2-octyl-p-phenylenediamine | Light brown | None. |
| 1 | 2 | N,N'-dimethyl-N,N'-di-2-octyl-p-phenylenediamine | Light grey | Do. |
| Control 2 | 2 | N,N'-di(1-ethyl-3-methylpentyl)-p-phenylenediamine | Dark brown | Much. |
| 2 | 2 | N,N'-dimethyl-N,N'-di(1-ethyl-3-methylpentyl)-p-phenylenediamine | Lavender | None. |
| Control 3 | 2 | N,N'-di-(1,1,3,3-tetramethylbutyl)-p-phenylenediamine | Grey | Little. |
| 3 | 2 | N,N'-dimethyl-N,N'-di(1,1,3,3-tetramethylbutyl)-p-phenylenediamine | Light grey | None. |
| 4 | 3 | Mixture of 1 pt N,N'-dimethyl-N,N'-di-2-octyl-p-phenylenediamine and 2 pts N,N'-tetraisobutyl-p-phenylenediamine | Very light grey | Do. |
| Control[1] | 3 | N,N'-tetraisobutyl-p-phenylene-diamine | Light grey | Very little. |

[1] For comparison with Samples 1 and 4.
*Contains about 1 part of Polygard as non-staining antioxidant added at the polymer plant.

FURTHER DISCUSSION OF RESULTS

Part I of this invention disclosed new antiozonants which per se in rubber containing insignificant amounts of antioxidants can protect elastomers against ozone cracking. Part II disclosed synergistic combinations of the antiozonants of Part I with antioxidants and/or waxes.

I have found that the quality of antioxidant required to obtain the synergism varies with the antioxidants used. Most of the synergistic combinations of antiozonants of Part I of this invention in combination with antioxidants such as those examples of Table A contained at least one part PBNA (added at the GR–S polymerization plants) in addition to the added antioxidants.

From the data obtained in dynamic ozone tests it appeared that 11 of the antioxidants of Table A used only in 2 parts per 100 parts elastomer in combination with less than 3 parts antiozonants of the present invention per 100 parts elastomer do not quite attain effective protection in GR–S 1500 compounds, viz:

| | |
|---|---|
| BLE-25 | Antioxidant 2246 |
| Diphenylamine | Dipropylene glycol monosalicylate ester |
| PBNA | |
| Rosinamine D | Neozone |
| Flectol H | Parazone |
| 1-naphthylamine | Polygard |

But it was noted from additional data that these 11 less actively synergistic antioxidants, when augmented by the 1.25 parts of antioxidant present in commercial GR–S, did give effective synergistic protection of the elastomer with less than 3 parts of antiozonant (similar to Example B–1 above noted wherein 1 pt. of antiozonant of the present invention is combined with 2 pts. of a tetra-primary-alkyl-substituted p-phenylenediamine).

It is accordingly shown that to attain good synergistic activity with those less actively synergistic antioxidants, it is necessary to employ increased quantities thereof, or some other synergist therewith.

With respect to the antiozonants of this invention, the comment as regards the insignificance of less than 1.5 parts total of antioxidants (that show significant synergism when used in greater than such amount) apply. The fact that paraffin wax alone is a better synergist than microcrystalline wax has also been demonstrated. The data obtained with antiozonants of the present invention show the effectiveness of the antiozonant per se, and the synergism therewith of waxes. In this connection, it will be noted that (1) the effectiveness of wax as a synergist is developed to a major extent at a wax content of about 1.5 parts wax with varying amounts of the antiozonant and (2) the improvement in the aged samples from the inclusion of wax with the antiozonant generally parallel those in the unaged samples.

It has been further demonstrated that the beneficial effect of wax in outdoor static tests is obtained. Thus in static usages even in the absence of synergistic antioxidants, the time to first cracking of GR-S samples containing 2.5 parts of the new antiozonants can be especially increased by inclusion of 1.5 parts wax.

The categories of antiozonants of the present invention are represented by the formula

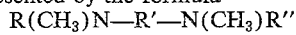

wherein R' is an arylene radical selected from the group comprising phenylene and diphenylene radicals and hydrocarbon substituted phenylene and diphenylene radicals R and R'' are alkyl radicals selected from the group comprising secondary and tertiary octyl, nonyl, decyl, undecyl and dodecyl radicals, and wherein the total number of carbon atoms in the hydrocarbon nucleus plus substitutents is from 24 to 37.

The data also demonstrate the application of the present invention to elastomers other than "hot" and "cold" GR-S. Natural rubber, polybutadiene, butadiene-methylvinylpyridine copolmer, butadiene-styrene-methacrylic acid copolymers and Hycar "N-rubber" have been successfully protected against ozone by synergistic antiozonant compositions of the present invention.

In summarizing the parts of this invention it has been demonstrated that: (1) the new antiozonants when used in from 1 to 5 parts in 100 parts elastomer protect the elastomer compound against ozone attack; (2) when the antiozonants of (1) are mutually combined or are combined with antiozonants of said copending applications, or are combined with appropriate quantities of antioxidants of the several classes of antioxidants and/or waxes, synergistic antiozonant compositions are formed wherein reduced amounts of antiozonants will serve to protect elastomer compositions.

The appropriate incorporation of the new antiozonant compositions, i.e., combinations of the substituted phenylenediamines with amino antioxidants, and/or waxes (and/or metal salts such as certain metal fatty acid salts gives virtual immunity against much higher than ordinary atmospheric concentrations of ozone, to elastomer compositions, even when the same have been subjected to radical heat-aging, thus showing that these antiozonant combinations are capable of protecting the products for long periods of time under dynamic as well as static conditions and at elevated temperatures.

The invention has further shown that when the total carbons of the compounds are kept within designated ranges the antiozonants are highly effective in aged stocks, it being thus shown that the ranges are critical for the protection of products subjected to high temperature resulting from dynamic usage or otherwise, but may be broadened to some extent (e.g., a carbon count of say eight carbons less than the heat-aged ranges) and still be suitable for protection of static goods not subject to elevated temperatures or dynamic usages.

Comparison of the results attained, mutually and with the controls, shows that various synthetic elastomers are protected against ozone by incorporation of three to five parts of the antiozonants therein; and the same considerations show that natural rubber is similarly protected, as well as polyisoprene prepared synthetically by emulsion polymerization processes, by alkali metal polymerization (e.g., Coral rubber of Firestone Tire & Rubber Co.), by organo-metal alkali catalysts (e.g., the Alfin type of catalyst) or by metal alkyl catalysts (e.g., aluminum trialkyl, lead tetraethyl and combinations of organo-metallic compounds with metal salts).

In addition to the examples given in the tables, copolymers of styrene and butadiene were prepared which contained small amounts of copolymerized carbonyl-containing monomers such as methylvinyl ketone, crotonaldehyde or methylisopropenyl ketone and compounded with the antiozonants of this invention, and the results showed that these antiozonants are useful as additives for these carbonyl-containing elastomers.

These and other elastomers may be employed as additives, e.g., plasticizers for plastomer products, for which polar elastomers are usually selected. In such cases ozone deterioration of the elastomer component is prevented by the antiozonants of this invention.

The samples shown in the tables cover the principal types of elastomers, above described, but the range of polymers and combinations protected against ozone attack by the present antiozonants is not limited thereto, as similar protection has been obtained with plastomer compositions containing elastomers (e.g., Butyl rubber, neoprene, polybutadiene, GR-S, acrylonitrile rubber, etc.), which per se show less susceptibility to ozone attack than for example, GR-S copolymers.

Butyl rubber is known to be less susceptible to ozone attack than are GR-S elastomers. However, ozone cracking of butyl vulcanizates is an industrial problem for certain uses as evidenced by the study of D. C. Edwards and E. B. Storey, Transactions of the Institution of the Rubber Industry, pp. 45-69, vol. 31, No. 2, April 1955. I have found Butyl rubber when plasticized with oils as commercially practiced to be considerably attacked by ozone. I have demonstrated that the antiozonants and synergistic antiozonant compositions of the present invention when appropriately compounded into Butyl rubber are capable of protecting the resultant Butyl vulcanizates against ozone attack. In like manner plasticized neoprene compounds are protected against ozone attack by appropriate use of antiozonants and antiozonant compositions of the present invention.

Variations in compounding of the elastomers can nullify the protective action of these antiozonants. For example, high amounts of waxes, plasticizers (particularly oils containing unsaturates, such as ParaFlux 2016 and Bardol), zinc stearate, rosin acids or stearic acid lower the effectiveness of our new additives in rubbers. Caution should be exercised by the compounder to avoid excessive amounts of such ingredients particularly where the elastomer is subjected to dynamic use (i.e., in amounts greater than one mole per mole of diamine antiozonant incorporated).

In general from 1 to 3 parts of the new diamine antiozonant per 100 of rubber in the absence of added antioxidants is adequate for practice of the present invention in protection of statically employed items (prepared from natural and synthetic rubbers) for practical periods of time against deterioration due to ozone attack; 3 or more parts are preferred for elastomer items in dynamic usages. In synergistic combinations, however, from 0.5 to 3 parts of the tetra-substituted p-phenylenediamines, tetra-substituted benzidines, tetra-substituted bis(aminophenyl)-amines, and tetra-substituted bis(4-aminophenyl) methands of this invention are sufficient to provide ozone protection for the elastomer compounds for both static and dynamic usage.

The amount of antiozonant compositions containing synergistic antioxidants and/or waxes required to give ozone protection to elastomers varies with the type of antioxidants and metal salts employed and depends at least in part on whether the antioxidants and metal salts are used in combination or singly; in general for the practice of the present invention the total amount of synergistic additives varies from 1.25 to 6 parts per 100 of elastomer. While the use of small amounts of waxes in rubber compounds together with antioxidants is recognized in the prior art, the appropriate combination of waxes with the antiozonants of the present invention, both with and without synergistic antioxidants to develop synergistic antiozonant compositions, constitutes an unforseeable and a valuable advance in the protection of elastomer and plastomer compositions against ozone cracking, in view of the fact that waxes were heretofore considered to be harmful for ozone resistance of elastomers in dynamic usage.

The antiozonants and synergistic antiozonant compositions of the present invention have also been found to be effective in protection against ozone cracking of plastomers which have residual unsaturation or active hydrogens such as may be present in methylene or methinyl groups. Thus resins or plastomer compositions comprising polymers and copolymers of vinylchloride, vinylacetate, alkylacrylates, etc., in combination with unsaturated polymer ingredients, are subject to attack by ozone, and such attack is avoided when the new antiozonants are present in such compositions.

It has further been demonstrated that the new antiozonants and synergistic antiozonant compositions can be compounded with the GR-S 1500 in the Banbury mixer, on the rubber mill, or by incorporation in the elastomer latices as above described either at the polymer plant or by the consumer at any time prior to coagulation and drying.

The additives of the present invention may be incorporated as fatty acid salts, and also salts of dibasic acids such as oxalic, maleic, and the like, without departing from the practice of this invention (examples of Table I and Table II).

The research has shown that the new compounds are valuable antiozonants of improved staining characteristics for plastomers and resins as well as for natural and synthetic rubbers and are particularly useful antiozonants for tires and similar natural and synthetic products (subject to ozone attack) which require relative long scorch times and which attain high operating temperatures, such as those temperatures attained by heavy duty truck tires, and such temperatures may even rise to above 300° F. in use. Antiozonants are herein defined as additive agents which protect the polymeric material, e.g., natural and synthetic rubbers, against deterioration due to ozone attack. While serving as antiozonants the new compositions also serve as antioxidants, i.e., the new products of this invention protect against deterioration of tensile properties of rubber compounds due to attack by oxygen and sunlight. However, the antiozonants must not be too reactive with oxygen or they can too rapidly disappear from the compounds incorporating them and ozone protection will thereafter be absent. The present classes of compounds represented by $R(CH_3)N-R'-N(CH_3)R''$ as well as each synergistic composition described herein is specific and differs in general from other amines such as diarylamines, arylenediamines, and their derivatives and mixtures with other types of antioxidants in that other members of these general categories and their mixtures will not effectively protect against attack by ozone.

These new antiozonant compositions have also been found effective in protection of elastomer dispersions such as latices of natural rubber, GR-S elastomer, neoprene, acrylonitrile copolymeric elastomers, and the like which are to be used for coating and film-forming purposes, e.g., for paper coating, wall paints, etc. By incorporation of the new antiozonant compositions in the latices together with the vulcanizing ingredients, the subsequently formed cured films therefrom are effectively protected against ozone cracking.

An "antiozonant composition" as used herein denotes any of the amine antiozonants represented by $$R(CH_3)N-R'-N(CH_3)R''$$

as herein defined, as well as each and every synergistic composition described in the preceding discussion whether containing one or more of each class of synergists described, i.e., waxes, certain metal salts, and the designated classes of antioxidants.

Herein the term elastomer is employed to designate an elastic polymer or macromolecule, whether a naturally-occurring material or a synthetic polymeric substance. Plastomer is defined as including both thermoset and thermoplastic high-molecular weight resinous and plastic materials. These definitions follow those used by Harry L. Fisher, Industrial and Engineering Chemistry, vol. 31, p. 942 (1939).

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and all modifications that come within the meaning and range of equivalency of the claims are intended to be included therein.

I claim:

1. A sulfur vulcanizable rubber normally subject to cracking containing, in sufficient amount to retard said cracking, an antiozonant composition essentially comprising a p-phenylene diamine having attached to each of its nitrogen atoms a methyl group and a tertiary alkyl group containing from 8 to 12 carbon atoms.

2. A sulfur vulcanizable rubber normally subject to cracking containing an antiozonant composition essentially comprising N,N' - dimethyl - N,N'-di(tert-octyl)-p-phenylene diamine in sufficient amount to retard its cracking.

3. A sulfur vulcanizable rubber normally subject to cracking, containing an antiozonant composition essentially comprising N,N' - dimethyl - N,N'-di(1,1,3,3-tetramethylbutyl)-p-phenylenediamine.

References Cited in the file of this patent

UNITED STATES PATENTS

| | | |
|---|---|---|
| 2,115,473 | Semon | Apr. 26, 1938 |
| 2,323,313 | Dennstedt | July 6, 1943 |
| 2,395,382 | Walters | Feb. 19, 1946 |
| 2,451,642 | Watson | Oct. 19, 1948 |
| 2,615,919 | Biswell | Oct. 28, 1952 |
| 2,781,330 | Downey | Feb. 12, 1957 |
| 2,822,396 | Dent | Feb. 4, 1958 |
| 2,883,362 | Rosenwald et al. | Apr. 21, 1959 |

OTHER REFERENCES

Shaw et al.: "Rubber World," vol. 130, August 1954, pp. 636–42.